United States Patent [19]
Korsch

[11] Patent Number: 4,632,521
[45] Date of Patent: Dec. 30, 1986

[54] NEAR-ANASTIGMATIC COMPACT COLLIMATOR

[75] Inventor: Dietrich G. Korsch, Huntsville, Ala.

[73] Assignee: The Boeing Company, Seattle, Wash.

[21] Appl. No.: 621,089

[22] Filed: Jun. 15, 1984

[51] Int. Cl.$^4$ ............................................. G02B 17/06
[52] U.S. Cl. ................................................. 350/505
[58] Field of Search ................ 350/505, 504, 442–444, 350/620

[56] References Cited

U.S. PATENT DOCUMENTS

| | | | |
|---|---|---|---|
| 1,747,928 | 2/1930 | Hesney | 350/620 |
| 2,697,379 | 12/1954 | Walker | 350/504 |
| 2,867,151 | 1/1959 | Mandler | 350/444 |
| 3,811,749 | 5/1974 | Abel | 350/443 |
| 4,205,902 | 6/1980 | Shafer | 350/620 |

OTHER PUBLICATIONS

Gelles, R. "Unobscured Aperture Stigmatic Telescopes" Opt. Engineering, 11/12-1974, pp. 534–538.
Korsch, D., "Design & Optimization Technique for Three-Mirror Telescopes", App. Optics, 11-1980, pp. 3640–3645.
Korsch, D., "Closed-Form Solutions for Imaging Systems, Corrected for Third Order Aberrations", Jr. Opt. Soc. Am. 6-1973, pp. 667–672.
Lagrula, J., "Three Mirror Telescopes" Cr Hebd. Sean. Acad. Sci. Ser. B (France) 8-1970, pp. 493–497.

Primary Examiner—William H. Punter

[57] ABSTRACT

A near-anastigmatic compact collimator having three mirrors for use in a high performance telescope and other similar applications. The mirrors are all connected together to form a solid, compact and stable collimator which is rotationally symmetrical to an optical axis through the collimator.

3 Claims, 2 Drawing Figures

NEAR-ANASTIGMATIC COMPACT COLLIMATOR

BACKGROUND OF THE INVENTION

The subject invention is a compact collimator for focusing light rays and the like and more particularly, but not by way of limitation, a near-anastigmatic compact collimator having three mirrors for use in a high performance telescope and similar applications.

Heretofore there have been various types of three mirror optical systems as described in the following United States Patents:
- U.S. Pat. No. 2,869,423 - Inventor, Hoge et al
- U.S. Pat. No. 3,674,334 - Inventor, Offner
- U.S. Pat. No. 4,205,902 - Inventor, Shafer
- U.S. Pat. No. 4,240,707 - Inventor, Wetherell et al
- U.S. Pat. No. 4,265,510 - Inventor, Cook.

Also, the design of a three mirror telescope is described in Volume 19, page 3640, Nov. 1, 1980 of *Applied Optics* by the subject inventor. None of the above-mentioned patents disclose or teach the unique structure and advantages of the subject invention. The above-mentioned article describes the theory for a high performance telescope, but not until now has the technology in the area of mirror fabrication advanced to allow the reduction to practice of the subject invention and accomplish the desired results as described herein.

SUMMARY OF THE INVENTION

The subject near-anastigmatic compact collimator provides three mirrors which are connected to form a solid, extremely compact and stable self-sustained light ray collimator.

A primary mirror reflects the light rays onto a secondary mirror. A tertiary mirror is disposed between the primary and secondary mirror and attached thereto. The final image forming rays reflected from the tertiary mirror passes between the light rays reflected between the first and second mirrors.

The mirrors are rotationally symetric to an optical axis through the center of the collimator. The collimator is rigorously corrected for spherical aberrations and coma with minimum astigmatism using the inventor's design theory as described in his article mentioned in the Nov. 1, 1980 issue of *Applied Optics*. Near-anastigmatic as mentioned herein meaning not only correcting for spherical aberrations and coma, but astigmatism as well.

The three mirror collimator when compared to conventional collimators is extremely compact with significant reduction in weight. Further, rigidity of construction is achieved by attaching the three mirror elements together.

The collimator has a flat field which is obtained by variation of the geometry using standard computer simulation. Complete collimation of the light rays is obtained by partial or full revolutions of the collimator about its optical axis of rotation.

The near-anastigmatic compact collimator for focusing light rays and the like on a focal plane includes a primary mirror having a concave surface for receiving light rays thereon. A secondary mirror having a concave surface receives the reflected rays from the primary mirror. A tertiary mirror having a convex surface receives the reflected rays from the secondary mirror and reflects the final image forming rays onto the focal plane. The tertiary mirror is disposed between the primary and secondary mirror and is attached thereto.

The advantages and objects of the invention will become evident from the following detailed description of the drawings when read in connection with the accompanying drawings which illustrate preferred embodiments of the invention.

DETAILED DESCRIPTION OF THE DRAWINGS

Figure 1:
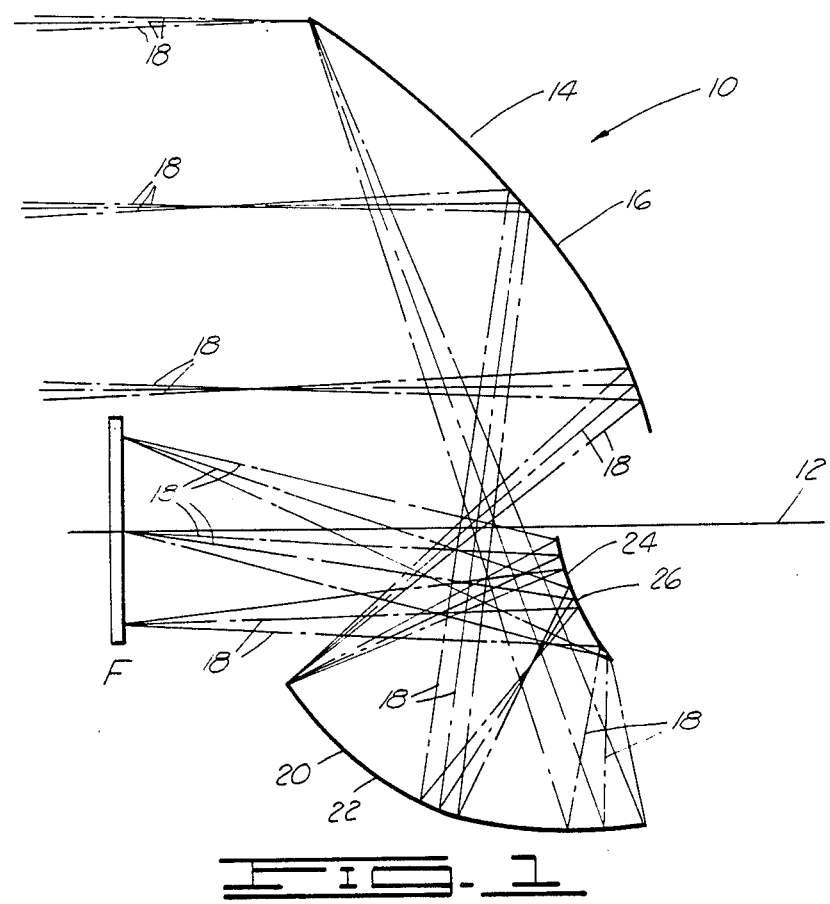
FIG. 1 illustrates a meridional sectional view of the compactor.

In FIG. 1 the near-anastigmatic compact collimator is shown and designated by general reference numeral 10. The collimator 10 rotates about an optical axis 12 through the center thereof. The collimator 10 includes a primary mirror 14 having a mirror surface 16 for receiving light rays 18.

The primary mirror surface 16 reflects the light rays 18 onto a mirror surface 20 of a secondary mirror 22. The secondary mirror 22 is disposed on the opposite side of the axis 12 of the collimator 10. The light rays 18 are then reflected onto a convex surface 24 of a tertiary mirror 26. The rays 18 are then reflected in a final imaging form onto a focal plane F.

Figure 2:
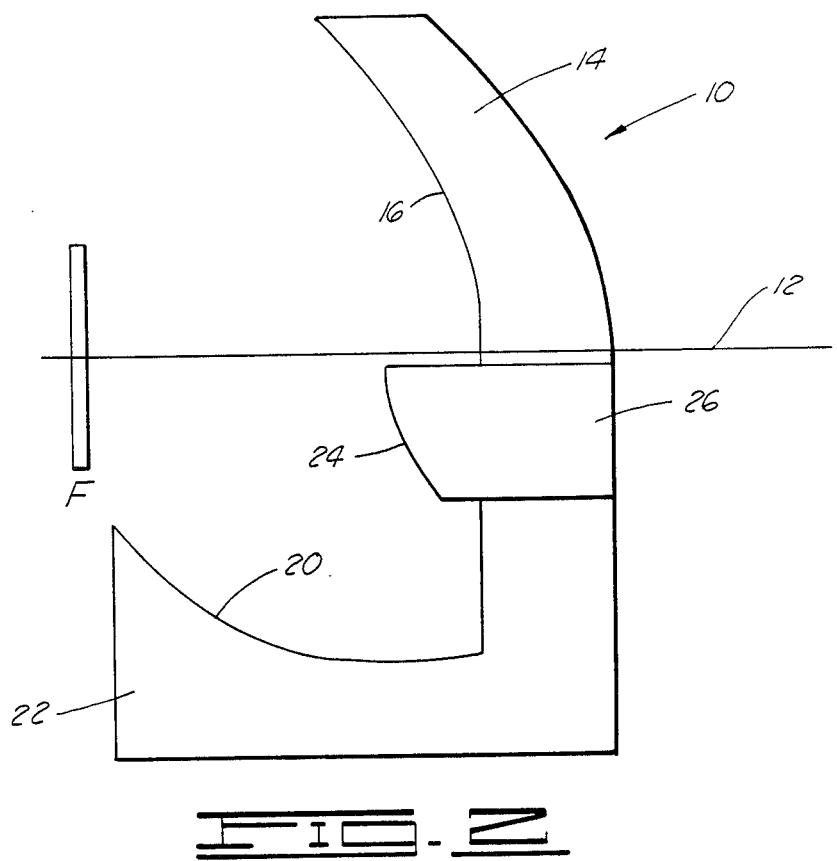
FIG. 2 illustrates the three mirrors of the collimator attached together.

It should be noted that the final image forming light rays 18 pass from the convex surface 24 of the tertiary mirror 26 between the light rays reflected from the first and second mirrors 14 and 22. The collimator 10 provides the three mirrors, 14, 22 and 26 to form a solid, stable collimator 10 as shown in FIG. 2.

As mentioned above the first mirror 14 is located above the axis 12 while the secondary and tertiary mirrors 22 and 26 are disposed below the axis 12. A straight line perpendicular to the optical axis intersects all three mirrors. The first and second mirror surfaces 16 and 20 are concave while the tertiary surface 24 is convex. All mirror surfaces are off-axis portions of surfaces rotationally symmetric to the optical axis. By securing the mirrors together as shown in FIG. 2 an extremely compact three-mirror collimator is provided which corrects for spherical aberration and coma with minimum astigmatism. By partial or full revolution about the optical axis 12 complete light ray analysis is obtained with the collimator providing a flat field which is obtained by a variation of the geometry using standard computer simulation.

Changes may be made in the construction and arrangement of the parts or elements of the embodiments as described herein without departing from the spirit or scope of the invention defined in the following claims.

What is claimed is:

1. A near-anastigmatic compact collimator for focusing light rays and the like on a focal plane, the collimator comprising:
   - a primary mirror having a concave surface for receiving light rays thereon;
   - a secondary mirror having a concave surface for receiving the reflected rays from the primary mirror; and
   - a tertiary mirror having a convex surface for receiving reflected rays from the secondary mirror and reflecting the final image focusing rays onto the focal plane, the tertiary mirror disposed between the primary and secondary mirror and attached to the primary and secondary mirrors for providing a compact threemirror collimator, the mirrors rotationally symmetric to an optical axis through the center of the collimator, the mirrors disposed on the collimator so that a straight line perpendicular to the optical axis would intersect all three mirrors.

2. The collimator as described in claim 1 wherein the primary mirror is located on one side of the optical axis while the secondary and tertiary mirrors are disposed on the other side of the optical axis.

3. A near-anastigmatic compact collimator for focusing light rays and the like on a focal plane, the collimator comprising:

a primary mirror having a mirror surface concave in shape for receiving light rays thereon;

a secondary mirror having a mirror surface concave in shape for receiving reflected rays from the primary mirror surface, the secondary mirror disposed on one side of an optical axis through the center of the collimator with the primary mirror disposed on the other side of the optical axis; and a tertiary mirror having a mirror surface convex in shape for receiving the reflected rays from the secondary mirror surface and reflecting the final image forming rays onto the focal plane, the tertiary mirror disposed on the same side of the optical axis as the secondary mirror, the tertiary mirror disposed between the primary and secondary mirror and attached to the primary and secondary mirrors for providing a compact three mirror collimator, the mirrors with mirror surfaces are rotationally symetric to the optical axis through the center of the collimator, the mirrors disposed on the collimator so that a straight line perpendicular to the optical axis would intersect all three mirrors.

* * * * *